United States Patent

Popat et al.

[11] Patent Number: 5,843,615
[45] Date of Patent: Dec. 1, 1998

[54] IMAGE-RECORDING TECHNOLOGY

[75] Inventors: Ghanshyam H. Popat, Alta Loma; Stephen M. Sharp, Glendora; Gustav A. Ray, Rancho Cucamonga, all of Calif.

[73] Assignee: Avery Dennison Corporation, Pasadena, Calif.

[21] Appl. No.: 566,506

[22] Filed: Dec. 4, 1995

[51] Int. Cl.⁶ .................. G03C 5/56; G03C 1/72
[52] U.S. Cl. ............ 430/138; 355/400; 355/404; 355/406
[58] Field of Search ................... 355/400, 404, 355/406; 430/138

[56] References Cited

U.S. PATENT DOCUMENTS

| | | |
|---|---|---|
| 2,612,451 | 9/1952 | Land ............................... 430/207 |
| 3,282,183 | 11/1966 | Tuttle et al. . |
| 3,506,782 | 4/1970 | Anwyl . |
| 3,673,936 | 7/1972 | Stone, Jr. et al. . |
| 3,737,315 | 6/1973 | Harvey ............................. 396/524 |
| 3,741,651 | 6/1973 | Nishiyama et al. . |
| 3,743,412 | 7/1973 | Morse . |
| 4,100,559 | 7/1978 | Wareham et al. ................ 396/518 |
| 4,387,984 | 6/1983 | Sato . |
| 4,399,209 | 8/1983 | Sanders et al. . |
| 4,438,453 | 3/1984 | Alston . |
| 4,440,846 | 4/1984 | Sanders et al. . |
| 4,467,369 | 8/1984 | Alston . |
| 4,482,919 | 11/1984 | Alston et al. . |
| 4,492,987 | 1/1985 | Burkhardt et al. . |
| 4,520,403 | 5/1985 | Burkhardt et al. . |
| 4,536,081 | 8/1985 | Gell . |
| 4,576,891 | 3/1986 | Adair et al. . |
| 4,660,098 | 4/1987 | Wolcott . |
| 4,685,000 | 8/1987 | Barrett . |
| 4,688,104 | 8/1987 | Wolcott . |
| 4,694,355 | 9/1987 | Constable . |
| 4,694,356 | 9/1987 | Constable . |
| 4,695,902 | 9/1987 | Wolcott . |
| 4,742,397 | 5/1988 | Ferla et al. . |
| 4,752,800 | 6/1988 | Matui . |
| 4,782,395 | 11/1988 | Jeffers . |
| 4,786,948 | 11/1988 | Matsui . |
| 4,855,940 | 8/1989 | Richardson et al. . |
| 4,931,825 | 6/1990 | Suzuki et al. . |
| 5,045,949 | 9/1991 | Shiota . |
| 5,049,949 | 9/1991 | Duke . |
| 5,068,905 | 11/1991 | Hackett et al. . |
| 5,072,253 | 12/1991 | Patton . |
| 5,140,648 | 8/1992 | Hackett et al. . |
| 5,276,779 | 1/1994 | Statt . |
| 5,303,056 | 4/1994 | Constable . |
| 5,369,499 | 11/1994 | Yip . |
| 5,390,020 | 2/1995 | Constable . |

FOREIGN PATENT DOCUMENTS

| | | |
|---|---|---|
| 0531891/A2 | 9/1992 | European Pat. Off. . |
| 0597396/A1 | 11/1993 | European Pat. Off. . |
| 0517108/A1 | 3/1994 | European Pat. Off. . |

*Primary Examiner*—John S. Chu
*Attorney, Agent, or Firm*—Oppenheimer Wolff & Donnelly LLP

[57] ABSTRACT

Image-recording technology records images displayed on a screen onto an image sheet. An image-recording assembly has an image sheet and an associated opaque shield. The shield is slidable to expose the image sheet to the image displayed on the screen. The image sheet may be of the type which has microcapsules containing photo-hardenable chemicals coated onto a base sheet. The image-recording assembly is positioned in front of a screen displaying an image with a user exposing the image sheet by shifting the position of the shield. The exposure time may be controlled manually by the user or automatically by software displaying the image on the screen. To develop the image sheet, unexposed microcapsules are ruptured by either applying pressure to the image sheet or forcefully sliding the image sheet across a sharp edge. The image-recording assembly may be flexible and is preferably less than 15 mils thick.

23 Claims, 6 Drawing Sheets

IMAGE-RECORDING TECHNOLOGY

BACKGROUND OF THE INVENTION

1. Field of the Invention

The present invention relates to image recording or to transferring images displayed on screens. More particularly, the present invention relates to recording images which are displayed on liquid-crystal-display (LCD) computer screens onto an image sheet.

2. Description of Related Art

It is often not possible to obtain a hard copy of an image displayed on a monitor by conventional means such as a printer. This may be due to the remote location of the monitor, particularly today with the proliferation of portable laptop and notebook computers. This may also be due to the inaccessibility of a printer or to the fact that the nature of the image is not compatible with an available printer. Furthermore, many people, particularly business people, travel with laptop computers. And although portable printers have made tremendous advances in size and weight, it is still inconvenient to travel with a portable printer along with the laptop computer. In addition, the price of portable printers is prohibitive to many consumers.

Therefore, rather than printing the screen or the image, photographing the screen to obtain the hard copy of the desired image is an alternative. For example, in the engineering field, it is well known to take instant pictures of oscilloscope screens to record waveforms of electronic circuits and components by using an instant camera with a baffle device.

Methods for photographing a display screen are varied. Many methods utilize instant film such as Polaroid™ film. Such film requires developing chemistry to be applied to the film after the film has been exposed to light. Further, the user must take care in not adversely overexposing this type of film as it is highly photosensitive.

An alternative to well-known instant film is encapsulated film. U.S. Pat. No. 5,049,902 to Duke discloses film containing microcapsules of photo-hardenable chemicals. Upon exposure to actinic radiant energy (i.e., energy which produces chemical changes), the chemicals solidify. Formation of the resultant desired image involves rupturing unexposed, nonsolidified microcapsules.

According to the present state of the art, recording a screen onto film has many drawbacks. Utilizing current apparatus requires a user to manipulate dedicated photographing apparatus, which is relatively bulky or which requires special attention by the user. Additionally, many of the methods and apparatus are not portable, preventing a user from obtaining screen images in remote locations. Therefore, convenient, uncomplicated, and portable methods and apparatus for recording screen images are absent in the art.

SUMMARY OF THE INVENTION

The image-recording technology of the present invention provides both image-recording assemblies and image-recording methodology. According to a broad aspect of the present invention, an image displayable on a screen is recorded by positioning a substantially thin and flexible image-recording assembly with mechanically developable photosensitive chemistry and a shield in front of a screen. The photosensitive chemistry is exposed in the presence of an image on the screen by moving the shield out of the image-recording assembly. Mechanical forces may then be applied to the photosensitive chemistry to compose the image.

According to one illustrative embodiment of the present technology, an image-recording assembly includes an opaque sleeve which has an aperture formed in one face thereof and a slot formed in a side thereof. A shield is slidably receivable in the opaque sleeve and through the slot to control the opening and closing of the aperture. A photosensitive image sheet is receivable in the opaque sleeve, with the shield being positioned between the aperture and the image sheet.

In implementation, the image-recording assembly is positioned in front of a screen on which an image is displayable with the aperture facing the screen. The image sheet is exposed by sliding the shield out of the sleeve through the slot. Exposure time may be determined manually by a user with the user sliding the shield back into the sleeve after a predetermined amount of time. Alternatively, the screen may be in communication with a computer with active software. The software may display the image for a predetermined amount of time with the shield slid open to expose the image sheet.

According to one aspect of the image-recording assembly of the present invention, the image sheet includes a layer of microcapsules which contain photo-hardenable chemicals. The microcapsules solidify upon exposure to actinic radiation. Accordingly, after the image sheet has been exposed to the image on the screen, the image sheet may be developed by rupturing the nonsolidified (i.e., unexposed) microcapsules. This rupturing may be realized by running the image sheet between a pair of pressure-applying rollers or through a relatively tortuous path formed by a pair of opposing blades. The rupturing of the microcapsules is preferably done simultaneously while removing the image sheet from the opaque sleeve. The rupturing may also be accomplished in a simplified manner by manually running the image-recording assembly back and forth across a relatively sharp edge.

One feature of the present invention is that the internal clock of a computer may be utilized in displaying the image on the screen for a predetermined amount of time. By doing so, consistent duplicity of recording the image is advantageously accomplished. Further, the image sheet may be made more photosensitive than if the exposure time were to be determined manually as adverse effects of inaccurate exposure times are eliminated. Complementary to utilizing the internal clock, the computer may also sound a signal when the exposure of the image sheet is complete.

Another aspect of the present invention is the provision of a lens or filter in the aperture of the opaque sleeve. There may be times when it is desirable to modify the image to be recorded by the image sheet. Therefore, light from the image may pass through the lens or filter prior to exposing the image sheet. Alternatively, the image may be modified by the software and then displayed to expose the image sheet in some desired way. This latter option is particularly useful as the intensity of the image may be reduced or increased depending upon the photosensitivity of the image sheet.

Yet another aspect of the image-recording assembly is that releasable mounting apparatus may be provided to releasably mount the assembly to or around a screen. One such apparatus may be pressure-sensitive adhesive applied in strips around the aperture of the opaque sleeve. By providing such -apparatus, a user is not required to manually hold the image-recording assembly to the front of the screen during the exposure time.

Other features of the present invention include light weight, portability, and flexibility. The image-recording assembly is relatively thin, no more than about 20 mils thick and preferably no more than about 15 mils thick. Further, the overall dimensions of the assembly are approximately equivalent to the size of common laptop computer screens, or about 10 inches along the diagonal dimension. Therefore, a user may easily travel with the image-recording assemblies, eliminating the need for lugging around a printer.

According to another illustrative embodiment of the present technology, an image-recording assembly does not have a dedicated and separate image sheet but rather photosensitive chemistry coated onto an inner face of an opaque sleeve itself. A shield slidable in the sleeve then controls the exposure of the photosensitive chemistry in accordance with the methodology outlined above. One of the advantages of this exemplary embodiment is that the thickness of the image-recording assembly is reduce by eliminating a backing sheet of an image sheet.

A further feature of the present invention is that the opaque sleeve may be formed from a single sheet of opaque material. This is accomplished by folding edge portions along the sides of the sheet of material to form slots in which the shield is slidable. An end portion of the sheet of material is then folded and fixed to the folded edge portions, thereby forming a pocket. Photosensitive chemistry may be coated onto an inner face of the sheet of material or a image sheet may be received in the sleeve for recording an image displayed on a screen.

Other aspects, features, and advantages of the present invention will become apparent to those skilled in the art from a reading of the following detailed description with reference to the accompanying drawings.

DETAILED DESCRIPTION OF THE PREFERRED EMBODIMENTS

Image-recording technology of the present invention, including apparatus and methodology, is illustrated by the exemplary embodiments of the drawings. Exemplary embodiments of this technology may take many different forms; however, the disclosure herein will detail only specific exemplary embodiments of the present invention and will not provide an exhaustive description of all other embodiments within the scope of the image-recording technology set forth herein and in the appended claims.

Figure 1:
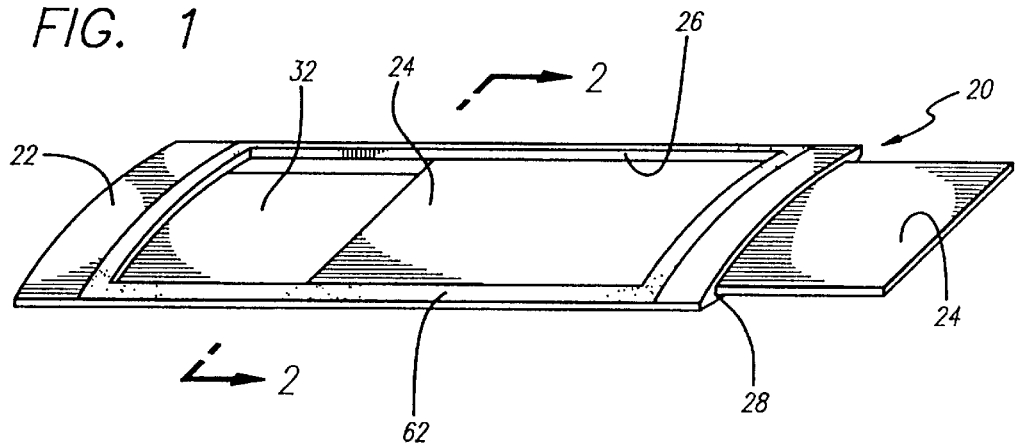
FIG. 1 is a perspective view of an exemplary embodiment of an assembly for recording an image displayed on a screen in accordance with the present invention.

Referring to the drawings, particularly to FIG. 1, an assembly 20 for recording an image is shown in perspective and generally includes an opaque sleeve 22 and a shield 24. The opaque sleeve 24 has an aperture 26 formed in one face thereof and a slot 28 formed along one end or side thereof. The shield 24 is made from an opaque material and is slidably receivable within the sleeve 22 and through the slot 28.

Figure 2A:
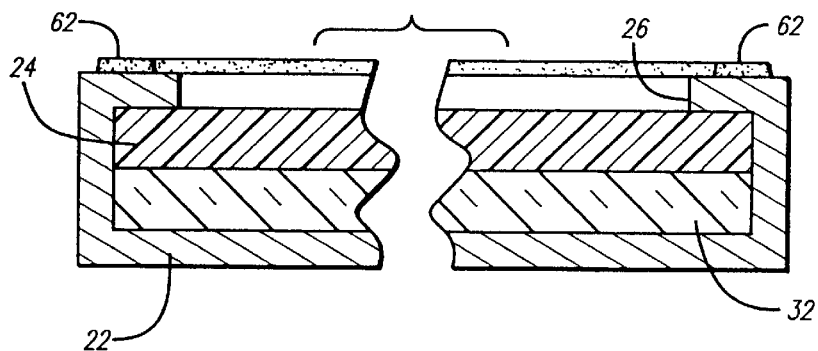
FIG. 2A is a cross-sectional view of the assembly for recording an image taken along line 2—2 of FIG. 1.
Figure 2B:
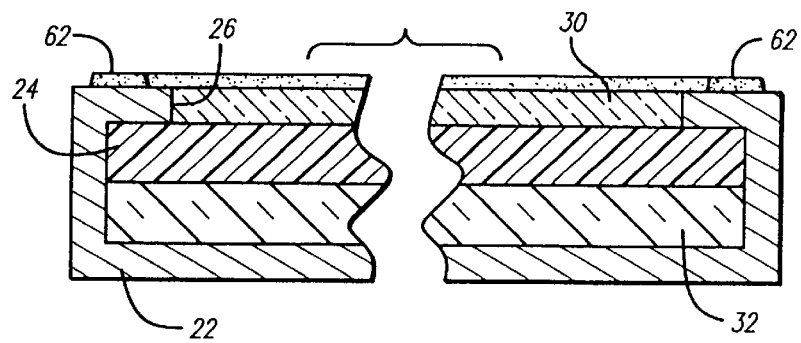
FIG. 2B is a cross-sectional view of another exemplary embodiment of the assembly for recording an image taken along line 2—2 of FIG. 1, particularly showing the representation of a lens or filter of the assembly.

With additional reference to FIGS. 2A and 2B, the shield 24 is preferably slightly larger than the aperture 26 so that light is blocked from entering the opaque sleeve 22 through the aperture 26 when the shield 24 is received within the sleeve 22. Similarly, the slot 28 is preferably just slightly larger than the shield 24 so that light is substantially blocked from entering the sleeve 22 through the slot 28 around the sleeve 24. Particularly referencing FIG. 2B, the window or aperture 26 may have a filter or lens 30 mounted therein, which is shown schematically and will be discussed in more detail below.

Figure 3:
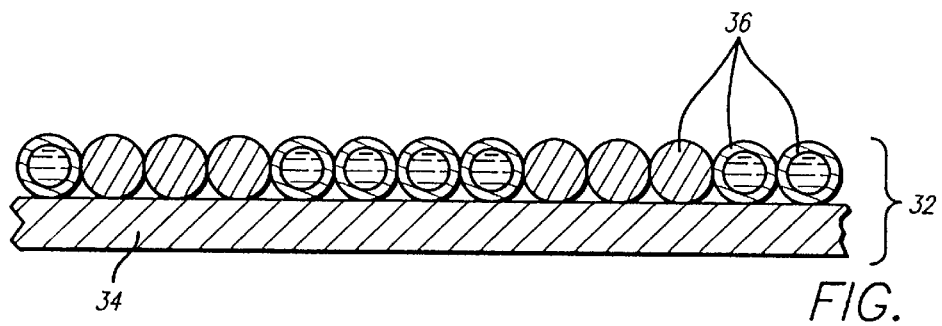
FIG. 3 is a cross-sectional view of encapsulated film of the type which may be used in the image-recording assembly of the present invention.

With further reference to FIGS. 2A and 2B and additional reference to FIG. 3, the image-recording assembly 20 further includes an image sheet 32. The image sheet 32, which may be thought of as a film medium, preferably includes a backing sheet 34 coated with a layer of microcapsules 36. In a general sense, the image sheet 32 contains photosensitive chemistry which is developed by mechanical means. For the purposes of this description, the image sheet 32 as shown in the drawings may of the type shown and described in U.S. Pat. No. 5,049,902 to Ronald J. Duke, which is incorporated herein by reference. Although the image sheet 32 is well described in the Duke patent, a brief description with be provided below. In the drawings, the thicknesses of the sleeve 22, the shield 24, and the image sheet 32 have been exaggerated for clarity in illustrating the principles of the present invention; however, the overall thickness of the image-recording assembly 20 is relatively small as the assembly 20 is substantially flexible, which will be discussed in more detail below.

Generally speaking, the microcapsules 36 of the image sheet 32 contain a photosensitive composition. Chromogenic material may also be associated with the microcapsules 36 by, for example, incorporation in a layer contiguous with the layer of microcapsules 36 or in the walls of the microcapsules 36 themselves. Exposure of the image sheet 32 to a source of actinic radiant energy, such as from a computer screen, causes the viscosity of the photosensitive material within the microcapsules 36 to increase such that microcapsules exposed to the radiant energy harden, shown in solid cross section in FIG. 3, and the microcapsules not exposed to the radiant energy remain viscous and liquid.

Any suitable combination of film chemistry including developer, chromogenic material, photo-hardenable material, etc. may be used in the image sheet 32, although the specific chemistry which is used is dictated by the specific application of the image-recording assembly 20. For example, as stated in column 6, lines 54 to 60, of U.S. Pat. No. 5,049,902: "[T]he developer material may be located on the same surface as the layer of microcapsules to form a self-contained sheet. In this configuration, the substrate is coated with a first coating of the photosensitive microcapsules. Alternatively, the microcapsules and developer material can be mixed and coated as a single layer as is readily understood in the art." Further, the photosensitive chemistry may solidify upon exposure to a predetermined range of wavelengths of radiation.

The image sheet 32 is receivable in the opaque sleeve 22 at a position where the slidable shield 24 is between the aperture 26 and the image sheet 32. The image sheet 32 may be releasably attached to the opaque sleeve 22 so that it will not move when the shield 24 is sliding. The image sheet 32 may also be releasably attached to the shield 24 in an arrangement in which the image sheet 32 moves responsive to the shield 24 after the shield 24 has moved a predetermined distance, which will be discussed in more detail below.

Figure 4:
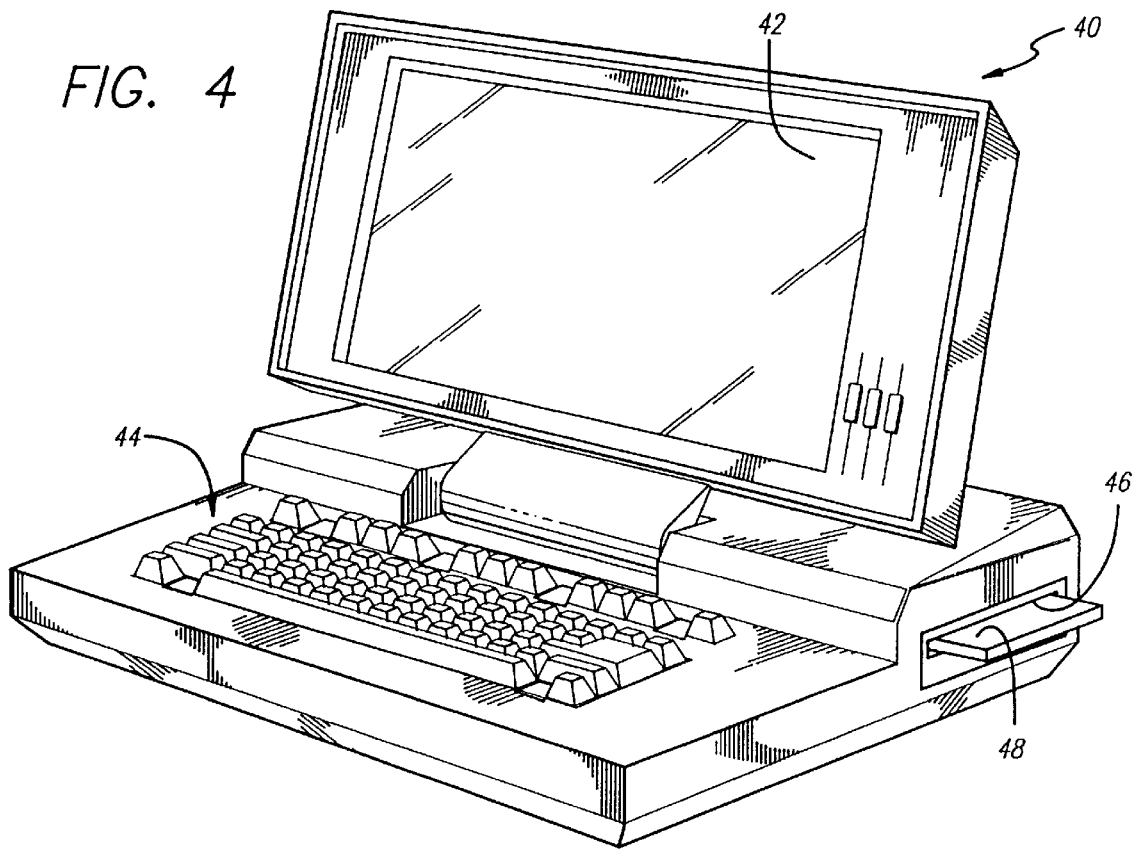
FIG. 4 is a perspective view of a laptop computer with a liquid-crystal display screen.

A portable laptop computer 40 is shown in FIG. 4. Laptop computers are well known and generally include a liquid-crystal-display (LCD) screen 42, a keyboard 44, and an internal hard disk drive (not shown) and often include an external disk drive 46 in which a floppy disk 48 is receivable. Notably, LCD screens are flat-panel displays which do not have a physically curved screen like screens used in convention cathode-ray-tube (CRT) displays. Accordingly, the imaging-recording assembly 20, which is preferably substantially planar, is substantially coplanar with the LCD screen 42 when positioned in front of the screen 42.

Referring to FIGS. 5 and 6A to 6D, methodology for recording an image with the assembly 20 is shown. Although in the exemplary embodiment which illustrates the principles of the present invention employs a laptop computer 40, the image-recording assembly 20 may be used with any other screen, monitor, or display means, including CRT display screens, on which an image to be recorded is displayable. Other examples of electronic appliances which use LCD screens to display information are notebook computers and numerous hand-held personal organizers and calculators. Further, although the exemplary embodiments shown in the drawings are illustrated with an LCD screen, other screens including active and passive matrix display screens such as plasma screens, which should become more common because of their thin structure, and back-lit display screens are equally applicable within the principles of the present invention. However, the inventors foresee that with the proliferation of laptop and notebook computers in business and industry coupled with their ability to operate under battery power in remote locations, that the equally portable image-recording assembly 20 would prove beneficially complementary when an output device such as a printer may not be conveniently utilized to obtain a hard copy of information in the computer.

The computer 40 with an internal hard drive is able to store software programs and image files. Further, software and/or image files may be loaded onto the computer 40 through the use of the floppy disk drive 46 and a floppy disk 48. A user is then able to activate software, as represented by block 50, to display a desired image to be captured on the screen 42, as represented by block 52. The software may have image-display capability or may simply be software which displays text such as word-processing programs. In the example shown in FIG. 6A, for simplicity's sake, the word "AVERY" (a registered trademark of the assignee of the present invention) is displayed on the screen 42. The word "AVERY" may be a dedicated image file or simply one portion of a document or text file loaded and currently active on the computer 40. For the purpose of exemplifying the principles of the present invention, it is desired to record or obtain a hard copy the image "AVERY" displayed on the screen 42.

In the discussion of the present exemplary case, the image happens to be a word. Therefore, when the image is recorded by the image-recording assembly 20, the resulting hard copy of the image will be a backward or mirror image of the desired image. If the image were a geometric design or digitized photograph, for example, then the resulting backward image may not be necessarily undesirable. However, more often than not it will be desirable to display the mirror image of the image to be recorded on the screen 42, as shown in FIG. 6B and represented by block 54 of FIG. 5, so that the image recorded on the image sheet 32 will be the mirror image of the displayed mirror image, that is, the originally displayed and correctly oriented image. This mirror-image displaying may be accomplished by activating mirror-imaging algorithms of software on the computer 40 by means of, for example, the keyboard 44 or another user interface device such as a mouse.

Figure 6A:
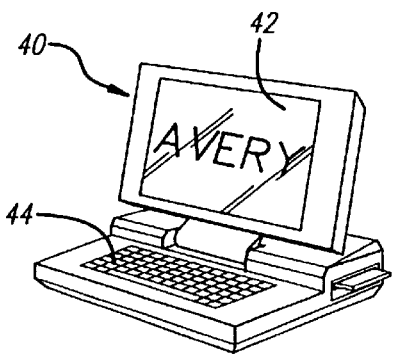
FIGS. 6A to 6D are perspective views illustrating exemplary image-recording methodology of the present invention.
Figure 6B:
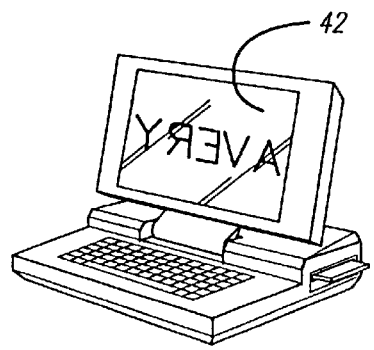
Figure 6C:
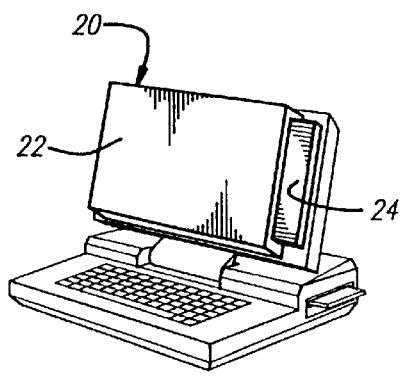

Depending upon the structure of the image-recording assembly 20, prior to positioning the image-recording assembly 20 in front of the screen 42 as shown in FIG. 6C and represented by block 56, the screen 42 may be blanked, that is, the software may be activated to remove the image from the screen 42. However, as the image sheet 32 is protected from any unwanted light entering through the aperture 26 by means of the shield 24, the blanking of the screen (block 58) is optional and only necessary when utilizing the least sophisticated forms of the imagerecording assembly 20, for example, an embodiment which may not necessarily employ a shield.

When positioning the image-recording assembly 20 in front of the LCD screen 42 (block 56), the assembly 20 may be held in place either manually by the user or by some dedicated attaching apparatus. Regarding the latter option, the assembly 20 may further include apparatus for releasably attaching the assembly 20 to the screen 42 or to the portion of the computer 40 surrounding the screen 42, as represented by block 60. With further reference to FIGS. 2A and 2B, the releasable attaching apparatus may be pressure-sensitive adhesive 62 applied in strips to the face of the opaque sleeve 22 in which the aperture 26 is formed, preferably applied perimetrically around the aperture 26 so as to block ambient light from exposing the image sheet 32. The adhesive strips 62 may be adhered directly to the screen 42. Alternatively, most laptop computers have a housing which surrounds the screen, to which housing the adhesive strips 62 may be adhered. Preferably, the adhesive strips 62 have peel-away backing sheets with a release layer which are removed prior to use of the assembly 20. Alternatively, the releasable attaching apparatus may also take the form of brackets for hooking over the top edge of the screen 42 or other similar means.

With the image-recording assembly 20 positioned in front of the LCD screen 42, the desired image may now be recorded on the image sheet 32 by exposing the image sheet 32 to the screen 42 and the image. As represented by block 64, the shield 24 is slid out of the opaque sleeve 22 through the slot 28 by a user. Depending upon the photosensitivity of the microcapsules 36 of the image sheet 32, the time needed to expose the image properly on the image sheet 32 will vary. For example, if the microcapsules 36 are highly photosensitive, then the exposure time may only need to be a few seconds, for example, five seconds to fifteen seconds. If the microcapsules 36 are less photosensitive, then the exposure time may be several minutes, for example, one minute to five minutes. Preferably, the image sheet 32 is about 1,000 times less sensitive to light than film typically used in Polaroid™ cameras. Accordingly, as the image sheet 32 is relatively photo-insensitive when compared to conventional film, the user may not need to be particularly careful or accurate in order to obtain a reasonably exposed image.

Figure 6D:
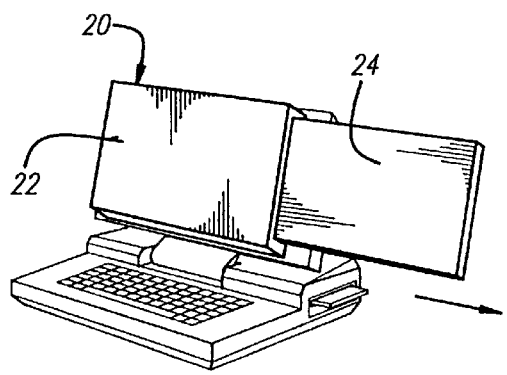

Expanding upon this feature, if the image-recording assembly 20 were compared to a camera, the step in sliding the shield 24 open, as shown in FIG. 6D and represented by block 64, would be analogous to shutter speed, which, in conventional photography, should be at least 1/60 of a second to ensure that the resulting photograph is not blurred because of movement by the photographer or by the subject. In the present invention, it would be nearly impossible for a user to open and close the shield 24 in 1/60 of a second; indeed, one would need to be extremely nimble to perform such an action in, say, one half of a second without jolting or shaking the entire combination of image-recording assembly and laptop computer. Accordingly, the relative insensitivity of the image sheet 32 is preferable in most embodiments of the present invention.

Exposure time is also dependent upon the intensity of the image displayed on the screen 42. For example, if the intensity of the displayed image were great, then the time needed to properly expose the image sheet 32 would be reduced, and vice versa. Accordingly, it is preferable for the image to be recorded to be modified if desired, as represented by block 65. Specifically, if the image sheet 32 is relatively photosensitive, then the intensity of the displayed image may be reduced so that the image sheet 32 is not overly exposed. Further, other variables of the image may be modified as desired, such as color, shape, size, and so on.

Figure 7A:
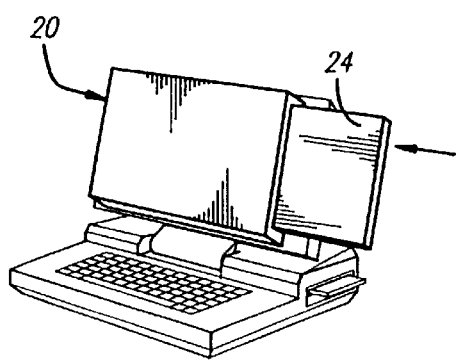
FIGS. 7A and 7B are perspective views illustrating exemplary image-developing methodology of the present invention.

The exposure time of the image on the image sheet 32 may be accomplished in any number of methods. Two such methods are exemplified herein. The first method only requires the image (i.e., "AVERY") to be displayed on the flat-panel screen 42 (block 54) and does not require the screen to be blanked (block 58). The user opens the aperture 26 by sliding the shield 24 out of the opaque sleeve 22 for a predetermined amount of time and then slides the shield 24 back into the sleeve 22, as shown in FIG. 7A and represented by block 66, with the image constantly displayed on the screen 42. As the image sheet 32 may be of the type which requires tens of seconds for proper exposure, this manual method may be implemented with the user observing a time piece to measure the predetermined amount of time. If the user deviates from the predetermined amount of time by a certain percentage, for example, plus or minus 10 percent, then this will not adversely affect the quality of the image recorded on the relatively photo-insensitive image sheet 32 of this embodiment.

Another method for exposing the image sheet 32 is more accurate as far as exposure time is concerned. This semi-automatic method requires more computer or software involvement in the exposure process. After the screen 42 is optionally blanked (block 58) with the assembly 20 positioned and releasably attached in front of the screen 42 (blocks 56 and 60) with the shield 24 slid open (block 64), the software loaded on the computer 40 is activated by a user to redisplay the image or the mirror image on the screen 42, as represented by block 68. The software on the hard disk of the computer 40 or on the floppy disk 48 displays the image to be recorded for a predetermined amount of time, utilizing the internal clock of the computer 40. After the predetermined exposure time, the software removes the image from the screen 42, i.e., blanks the screen 42, as represented by block 70. As the assembly 20 may substantially cover the entire LCD screen 42, thereby blocking out visual confirmation for a user, the software and computer 40 preferably signal that the predetermined amount of exposure time has elapsed, as represented by block 72, preferably with an audio signal such as a beeping sound.

Figure 5:
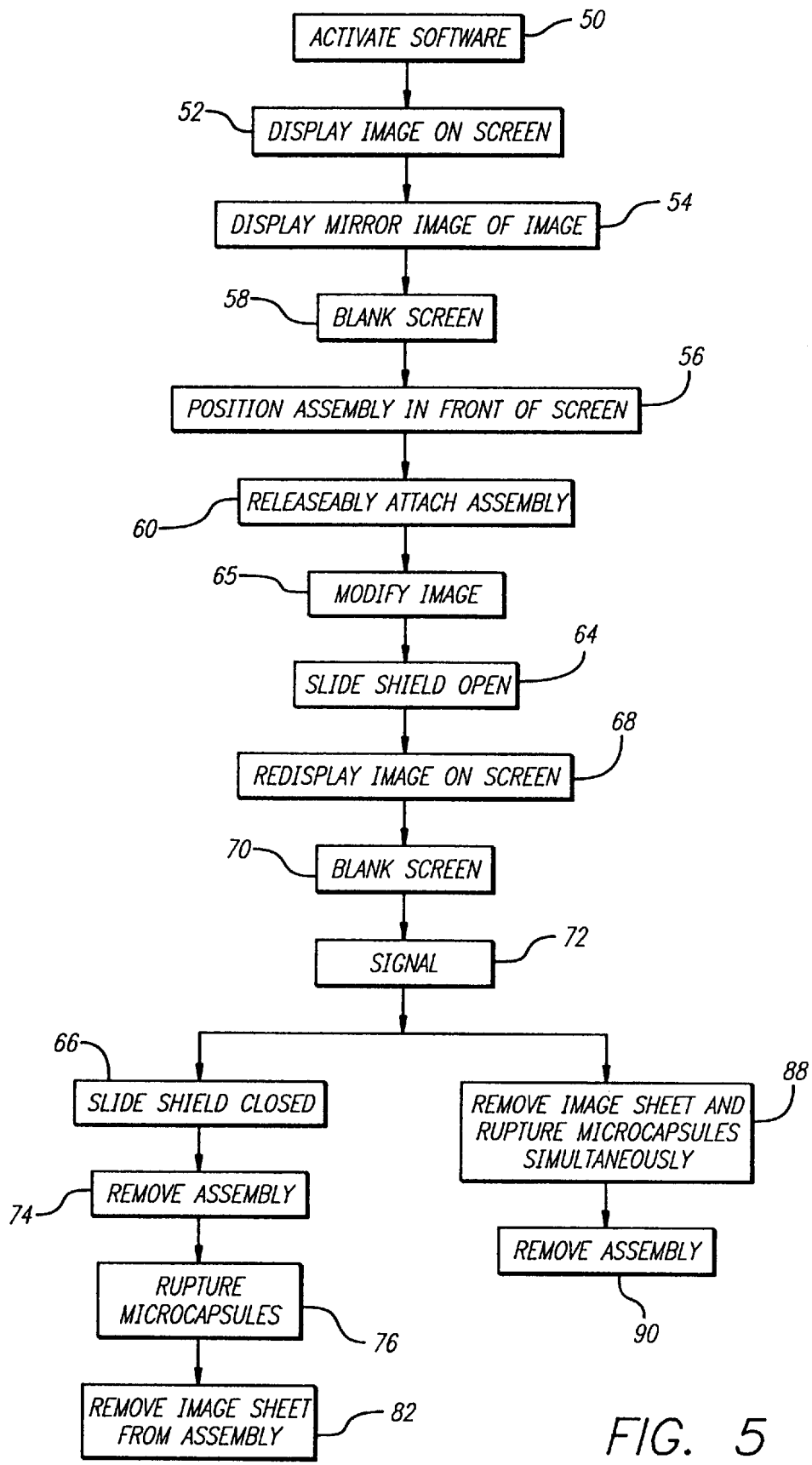
FIG. 5 is a flow chart illustrating methodology principles of the present invention.

It is worth noting that the image-recording methodology described thus far is not limited to the specific order of steps shown in FIG. 5 but may suitably be altered within the principles of the present invention. For example, rather than activating software (block 50) prior to positioning the assembly 20 in front of the screen 42 (block 56), if the user is familiar with the image to be recorded, the assembly 20 may be positioned in front of the screen 42 firstly and then the software may be activated to expose the image sheet 32. Further, if the image to be recorded is stored in a file known to the user, it is not necessary then to display the image prior to exposing the image sheet 32.

After the image sheet 32 has been exposed for the predetermined amount of time, the image will have been recorded on the image sheet 32 as desired. Although the methodology thus described is concerned with the actual recording of an image or the producing of a hard copy of an image displayed on a screen, the image-recording technology of the present invention further provides methodology for developing the image recorded on the image sheet 32, as discussed below. However, at this time it should be noted that the above-described assembly and method allows a user to expose the entire image sheet 32 at one time to the image displayed on the screen 42, not section by section or by moving an aperture across the image sheet. By exposing the image sheet 32 this way, the user enjoys greater reproducibility and consistency in recording images displayed on screens.

Figure 7B:
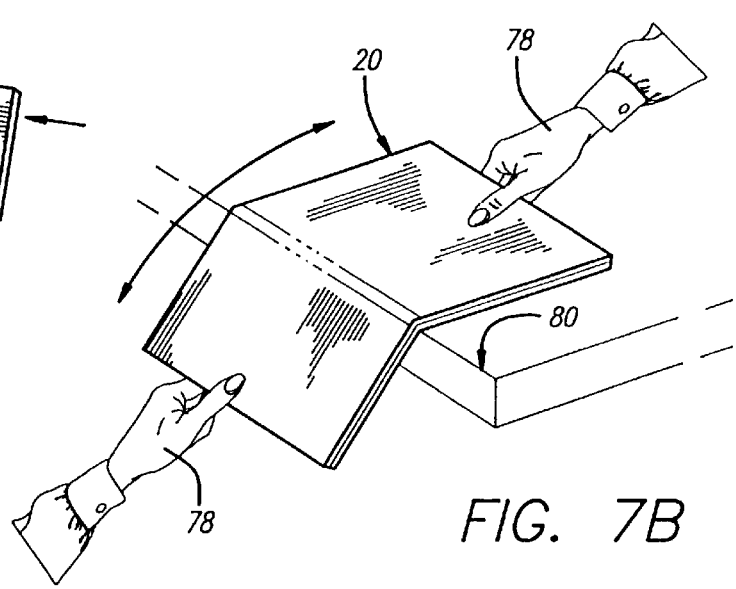

A first developing method is inexpensively implemented by requiring a minimal amount of equipment, thereby essentially eliminating personnel training often required for special processing or developing equipment. Referring to FIGS. 7A and 7B, upon completing the exemplary exposure embodiment discussed above in which the shield 24 is slid back into the opaque sleeve 22 to close the aperture 26 after the predetermined amount of exposure time (block 66), the assembly 20 is removed by a user from its position in front of the screen 42, as represented by block 74.

As described in U.S. Pat. No. 5,049,902 to Duke, radiation from the image to the microcapsules 36 of the image sheet 32 causes the radiation-curable composition of the microcapsules 36 to polymerize, thereby gelling or solidifying. Microcapsules 36 not exposed by radiation from the image remain in liquid form. To compose the image for visual inspection, the unexposed microcapsules 36 need to be ruptured.

Accordingly, the next step in the development process concerns rupturing the unexposed microcapsules 36 of the image sheet 32, as represented by block 76. The rupturing may be done in any number of ways but is exemplified in FIG. 7B. In the exemplary mechanical developing step shown, the hands 78 of a user firmly grasp the ends of the image-recording assembly 20, holding the shield 24 in place within the sleeve 22, and the user slides the assembly 20 back and forth across a substantially sharp edge 80, for example, of a table or counter-top or even across the edge of the laptop computer 40 itself. As the assembly 20 is flexible, the assembly 20 bends under the force applied by the user, so that nonsolidified microcapsules 36 rupture with their contents interacting with developer to produce visibly marked areas which together compose the final image.

After the user determines that sufficient rupturing mechanical developing activity has taken place, that substantially all the nonsolidified microcapsules 36 have been ruptured, then the image sheet may be removed from the image-recording assembly 20, as represented by block 82, for inspection and utilization by the user. The assembly 20 less the image sheet 32 with the now-recorded image of "AVERY" may either be discarded or saved for future use. Alternatively, a new image sheet may be loaded into the image-recording assembly 20 for another exposure process. Prior to rupturing the unexposed or nonsolidified microcapsules 36, the image sheet 32 is still photosensitive and may be further exposed if desired. However, after the rupturing process has taken place, the image sheet 32 is light insensitive and may be exposed to ambient light without adverse exposure effects on the microcapsules 36. This developing method, although incorporating relatively unsophisticated apparatus, carries high utility value as it is readily applicable in remote locations such as in the field or when more expensive alternatives do not prove cost effective or convenient.

Figure 8A:
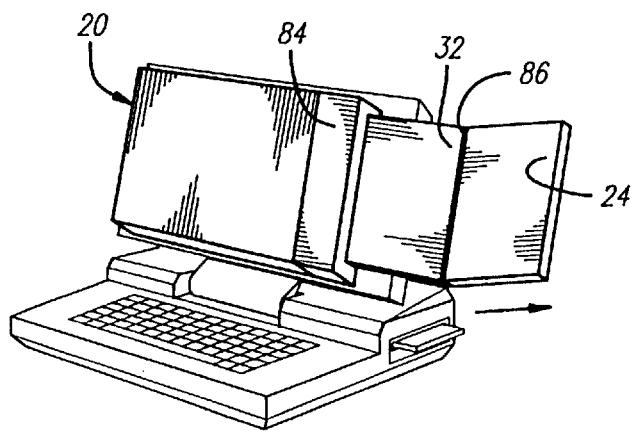
FIGS. 8A and 8B are perspective views illustrating further exemplary image-developing methodology of the present invention.
Figure 8B:
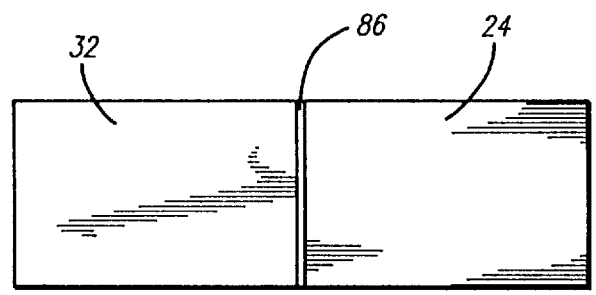

A more sophisticated but no less versatile method to developing the image sheet 32 by rupturing the microcapsules 36 is shown in FIGS. 8A and 8B. In this exemplary mechanical developing embodiment, the image-recording assembly 20 further includes mechanical developing apparatus, generally reference by numeral 84. The mechanical developing or rupturing apparatus 84 is disposed on the image-recording assembly 20 on the end in which the slot 28 is formed. Further, the shield 24 and the image sheet 32 are releasably attached together at ends thereof, shown as a bonding section 86, by known means such as adhesive. The shield 24 and the image sheet 32 are preferably attached so that the image sheet 32 only moves after the shield 24 has moved a predetermined distance, for example, at a point slightly farther than required to completely open the aperture 26.

After the image sheet 32 has been exposed for the predetermined amount of time, rather than closing the aperture 26 by sliding the shield 24 into the opaque sleeve 22 as shown in the previous exemplary embodiment, the user pulls the shield 24 out of the sleeve 22, thereby pulling the image sheet 32 through the mechanical developing apparatus 84 and out of the sleeve 22. As mentioned in the prior example, after the microcapsules 36 have been ruptured, the image sheet 32 becomes light insensitive. Therefore, this simultaneous removal of the image sheet 32 and rupture of the microcapsules 36 by the rupturing apparatus 84, as represented by block 88, will not undesirably expose the image sheet 32 as the image sheet 32 is photo-insensitive by the time it is exposed to ambient light.

After the entire image sheet 32 has been pulled out of the opaque sleeve 22, as shown in FIG. 8B, the shield 24 may be removed therefrom by tearing or cutting along the bonding section 86. Alternatively, perforations may be provided which are sufficiently strong so that the shield 24 is able to pull the image sheet 32 through the rupturing apparatus 84 while still allowing a user to separate the shield 24 from the sheet 32. Finally, if no further images need to be recorded, the image-recording assembly 20 may be removed from in front of the flat-panel screen 42, as represented by block 90. Alternatively, additional images may be made as the assembly 20 preferably is loaded with a plurality of image sheets or is reloadable with a new image sheet.

Figure 9:
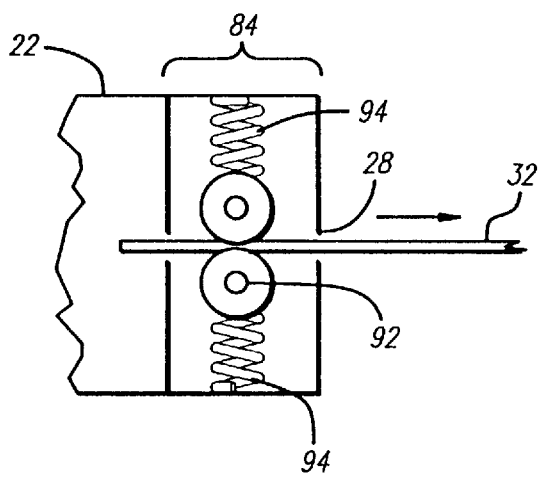
FIG. 9 is a cross-sectional schematic view illustrating exemplary pressure-applying apparatus in accordance with principles of the present invention.
Figure 10:
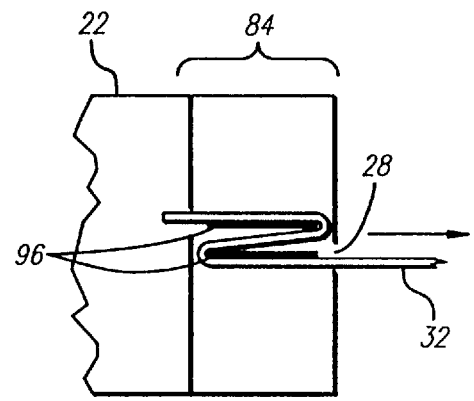
FIG. 10 is a cross-sectional schematic view illustrating further exemplary pressure-applying apparatus in accordance with principles of the present invention.

Referring to the rupturing apparatus 84, two exemplary embodiments of the rupturing apparatus 84 are shown in FIGS. 9 and 10, both of which apply mechanical forces to the image sheet 32 to compose the desired image. With specific reference to FIG. 9, the rupturing apparatus 84 includes a pair of rollers 92 and a corresponding pair of springs 94. The rollers 92 disposed in a substantially parallel relationship with the slot 28 formed in the end of the opaque sleeve 22. The rollers 92 are preferably arranged so that the slot 28 is substantially aligned with the crevice between the rollers 92. The springs 94 are designed and disposed to urge the rollers 92 together at a predetermined force. Accordingly, when the image sheet 32 passes between the rollers 92, the inward compressive force from the springs 94 ruptures nonsolidified microcapsules 36. In this embodiment, the rupturing apparatus may be thought of as pressure-activation apparatus. As the image-recording assembly is preferably flexible and relatively thin, the amount of force required to rupture the microcapsules is relatively low.

Another exemplary embodiment of the rupturing apparatus 84 is shown in FIG. 10 and generally includes a pair of blades 96. Similar to the rollers 92 discussed above, the blades 96 are disposed in a substantially parallel relationship with the slot 28 of the opaque sleeve 22. The blades 96 are arranged with respective edge surfaces thereof in opposing directions; that is, the edge of the blades 96 on which the image sheet 32 contacts face opposite directions. Further, the blades 96 are arranged in a non-coplanar relationship with each other so that a path through which the image sheet 32 passes is sufficiently tortuous to rupture the nonsolidified microcapsules 36 of the image sheet 32. As both embodiments of the rupturing apparatus 84 exemplified herein are self-contained on the image-recording assembly 20 itself, these developing methods may easily be implemented in the field where convention printing means are not available or possible.

Figure 11:
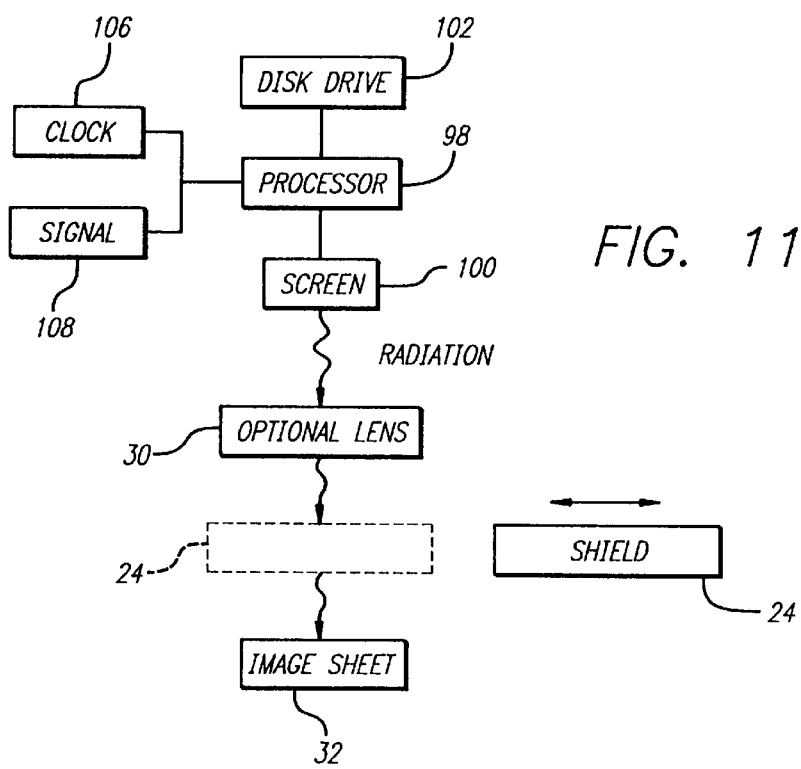
FIG. 11 is a block diagram illustrating an exemplary image-recording embodiment of the present invention.

FIG. 11 provides a generalized block diagram of a preferred arrangement of various components of the present invention. Rather than the specific laptop or notebook computer 40 used in the above exemplary embodiments, the present invention is well applied to electronic appliances in general which include a processor 98 in communication with a monitor or screen 100 and a storage means, memory device, or disk drive 102. The processor 98 upon activation by a user by means of a user interface device (such as a keyboard or a mouse) activates image-display software from the disk drive or memory device 102 to display an image on the monitor 100. Radiation 104 from the monitor 104 exposes the image sheet 32 when the shield 24 is not blocking the aperture (not shown) in which a lens or filter 30 may be mounted. Additionally, as mentioned earlier, the processor 98 is preferably in communication with an internal clock 106 and a signal device 108 for semi-automated exposure methodology.

Regarding the lens 30 further, depending upon the sensitivity of the image sheet 32, the light radiating from the screen 42 may be undesirably intense or bright. Accordingly, in some applications of the present invention, it may be preferable to provide a lens 30 which also filters or attenuates the intensity of the light from the screen 42. Further, the lens 30 may be a special filter so that only a desired range of wavelengths of light or actinic radiation passes therethrough. Accordingly, the lens or filter 30 may be mounted in the aperture 26 either permanently or releasably so that lenses and filters may be interchanged as desired. It is worth noting that the lens 30 is shown schematically in FIG. 2B, that is, substantially flat and rectilinear, for clarity. In commercial embodiments of the present invention, the lens 30 may be curved convex or concave, depending upon the desired application, as known to those skilled in the optical arts.

The light emitted from the screen may also be manipulated by the imaging-displaying software loaded on the computer. For example, if the image sheet 32 being used is relatively photosensitive such as instant-type film, then the software can attenuate or normalize the intensity of the radiated light to a predetermined value. Further, the software may also manipulate or adjust other components of the light of the display, such as color.

Figure 12:
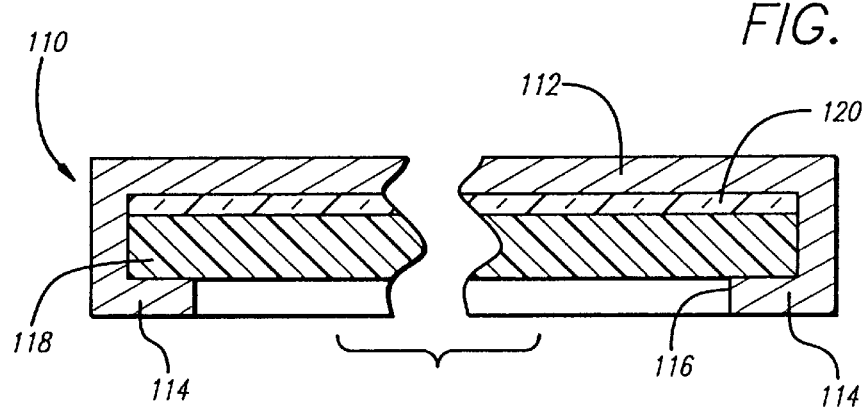
FIG. 12 is a cross-sectional view of another exemplary embodiment of an assembly for recording an image displayed on a screen in accordance with principles of the present invention.

Referencing FIG. 12, another exemplary embodiment of an image-recording assembly 110 in accordance with the present invention is shown. The assembly 110 generally includes an opaque sleeve 112 which is preferably formed by a single piece of opaque material with edge portions thereof folded back upon itself to form U-shaped portions 114 with an aperture 116 defined between the U-shaped portions 114. An opaque shield 118 is slidable received within the sleeve 112 between the U-shaped portions 114. As discussed above, the image-recording assembly 110 is relatively thin so as to be substantially flexible.

In this embodiment, rather than provide an individual image sheet within the sleeve 112, a layer of photosensitive chemistry 120 is coated on an inside face of the opaque sleeve 112. By such a provision, the backing sheet (cf. element 34 of FIG. 3) of the image sheet described above is essentially eliminated; that is, the sleeve 112 serves as the backing sheet for the layer of photosensitive chemistry 120. The image-recording assembly 110 may be implemented according to the methodology described above. The photosensitive chemistry 120 preferably contains developing chemistry as well so as to eliminate unnecessary developer-application steps. As described above, the layer of photosensitive chemistry 120 may be contained in microcapsules.

Figure 13:
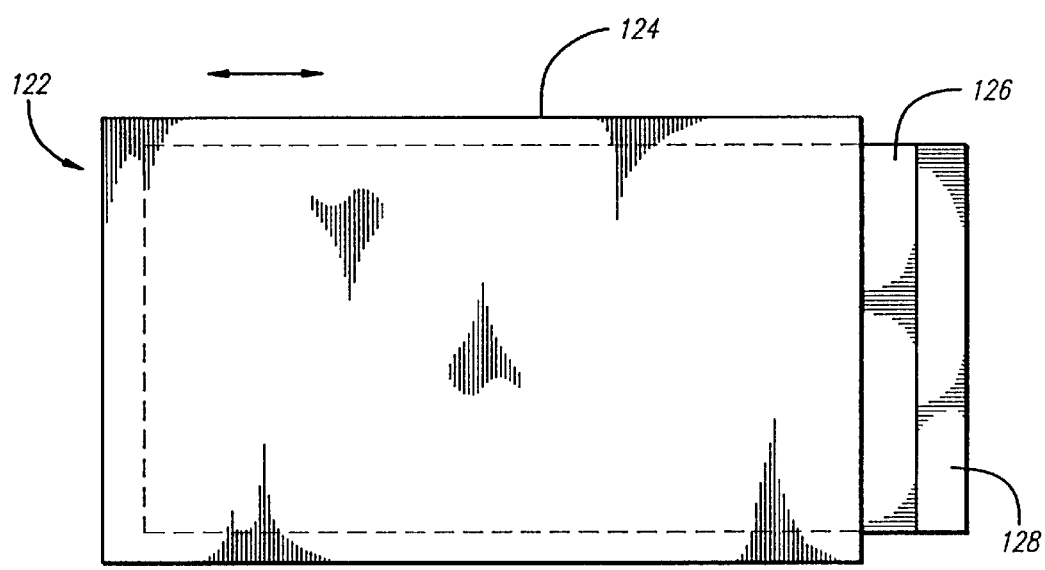
FIG. 13 is a top view of another exemplary embodiment of an image-recording assembly illustrating principles of image-recording technology of the present invention.

Referring to FIG. 13, another exemplary embodiment of the present invention is shown. An image-recording assembly 122 includes an opaque sleeve 124 and an image sheet 126 slidably receivable in the sleeve 124. The length of the image sheet 126 is slightly greater than that of the opaque sleeve 124 so that a small portion of the image sheet 126 protrudes from the sleeve 124. A strip of pressure-sensitive adhesive 128 is preferably coated on the protruding portion of the image sheet 126. In this embodiment, the opaque sleeve 124 does not have any aperture formed therein but is configured much like a record jacket with only one slot formed in the side thereof through which the image sheet 126 is slidable.

To record an image with the image-recording assembly 122, a user either manually holds the protruding portion of the image sheet 126 to a screen or adheres the adhesive strip 128 to a screen of a computer or similar device. The user then slides the sleeve 124 off of the image sheet 126 with the image sheet 126 remaining stationary against the screen. After a predetermined amount of time, the sleeve 124 is slid back onto the image sheet 126, as shown by the arrow in FIG. 13. This embodiment requires that the image sheet 126 be substantially light insensitive as small movement of the image sheet 126 may likely occur.

Figure 14:
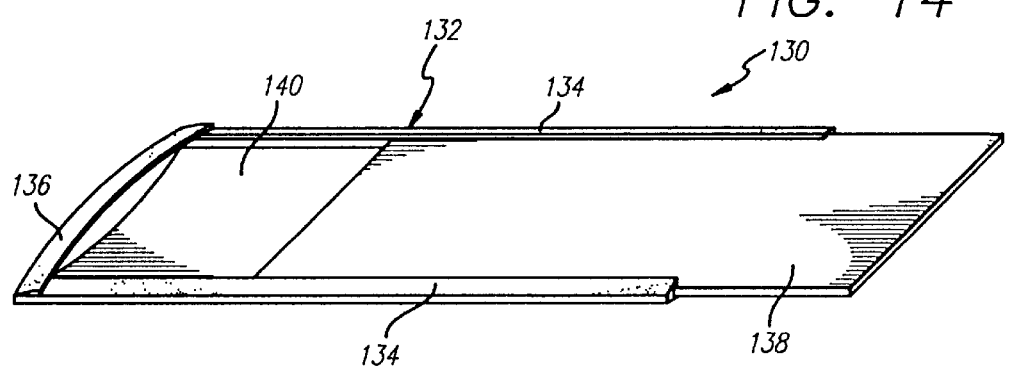
FIG. 14 is a perspective view of a further exemplary embodiment of an image-recording assembly in accordance with the present invention.

FIG. 14 illustrates yet another exemplary embodiment of a image-recording assembly 130 according to the technology of the present invention. The image-recording assembly 130 includes a sleeve 132 which is preferably formed from a single sheet of material, for example, opaque paper. The sleeve 132 has a folded side portions 134 running the length of the sleeve 132 and a folded end portion 136 along one end of the sleeve 132. The folded end portions 136 may be fixed to the folded side portions 134, for example, by adhesive. An opaque shield 138 is slidably receivable in the sleeve 132, particularly in slots formed by the folded side portions 134. Photosensitive chemistry 140 is provided which may either be coated on the inside face of the sleeve 132 or be in the form of an image sheet as described above. As is the case in the previously described embodiments, the embodiment of the image-recording assembly shown in FIG. 14 is preferably thin and flexible so that a user may easily apply mechanical force to rupture nonsolidified microcapsules of the film chemistry 140. Preferably, the image-recording assembly 130 is less than about 20 mils thick.

The single-sheet image-recording assembly 130 may be easily formed by providing a sheet of material and then folding the sheet of material along opposite sides to form slots. The end of the sheet of material is then folded to form a pocket in the sheet of material. Prior to or after folding the sheet of material, film chemistry may be applied to the inside face of the sheet of material. A shield which is preferably made from a relatively thin sheet of opaque material may then be slid into the slots formed along the sides to block the film chemistry from receiving unwanted radiation.

A specific commercial embodiment of the image-recording assembly 20 according to the present invention may be assigned the following specifications. The size of the opaque sleeve 22 is preferably at least the size of the screens of most laptop computers available on the market, so that the aperture 26 can encompass the screen for full illumination of the image sheet 32. For example, the Compaq Contura laptop computer has a screen which measures approximately 10 ½ inches at the diagonal or 8⅜ inches by 6⅜ inches along the width and height, respectively. The screen for this computer also has housing which surrounds the screen with a border of approximately 1½ inches. Accordingly, it is preferable for the diagonal of the aperture 26 of the image-recording assembly 20 marketed for such a computer to have a substantially equivalent dimension. Other dimensions may include typical paper size of 8½ by 11 inches, as photosensitive chemistry may be simply coated onto letter-size paper. However, smaller image-recording assemblies are also preferable for use with smaller screens or for recording sections of larger screens. The image sheet 32 may comprise Cycolor film.

Regarding the thickness of the image-recording assembly, the image-recording assembly is preferably thin and substantially flexible. Therefore, the image sheet may range in thickness from about 1.0 mil to 30 mils. The thickness of the opaque sleeve may range from about 2.0 mils to 10 mils. Accordingly, the overall thickness of the image-recording assembly described above is relatively thin (rather than the exaggerated thicknesses shown in the drawings for clarity) and is preferably no greater than about 20 mils. Accordingly, the assembly may be easily and conveniently stored in brief cases or attaches much like ordinary paper.

Those skilled in the art will understand that the preceding exemplary embodiments of the present invention provide foundation for numerous alternatives and modifications. These other modifications are also within the scope of the image-recording technology of the present invention. Thus, by way of example but not of limitation, the image-recording assembly and methodology of the present invention may provide an image sheet comprised of a layer of microcapsules coated on a single sheet of common paper or plastic film material. Further, the opaque sleeve and shield may also be comprised of paper or plastic film, or other suitable material which is substantially flexible so that rupturing of the microcapsules may take place. Accordingly, the present invention is not limited to that precisely shown and described herein.

What is claimed is:

1. A method of recording images from a portable computer screen comprising the steps of:

preparing a thin flexible image-recording assembly including a mechanically developable image sheet and an associated thin flexible shield, said assembly being less than approximately 20 mils thick;

mounting said assembly on the screen of a portable computer;

removing said shield in the presence of an image on said screen, to form an image on said image sheet;

replacing said shield to cover said image sheet;

applying mechanical forces to said assembly to develop the image on said image sheet; and removing said shield to view the developed image;

whereby a copy of an image on a portable computer may be obtained without access to a printer.

2. The method of claim 1 wherein:

said preparing step comprises the step of preparing a thin flexible image-recording assembly including a mechanically developable image sheet, an associated thin flexible shield, and pressure-sensitive adhesive; and said mounting step comprises the step of mounting said assembly on the screen of a portable computer with said pressure sensitive adhesive.

3. The method of claim 1 wherein:

said preparing step comprises the step of preparing a thin flexible image-recording assembly including an image sheet with a layer of photo-hardenable microcapsules and an associated thin flexible shield; and said applying step comprises the step of applying mechanical forces to said assembly to develop the image on said image sheet by rupturing non-hardened microcapsules.

4. A method for recording an image displayed on a screen, the image being recorded on an image sheet comprising a layer of microcapsules each of which contain a photo-hardenable composition, the method comprising the steps of:

activating image-display software on an electronic appliance having a screen;

displaying an image to be recorded on the screen;

blanking the screen by removing the image to be recorded from the screen;

positioning an image sheet in front of the screen; and exposing the image sheet with the image to be recorded.

5. The method of claim 4 wherein the exposing step comprises the steps of:

redisplaying the image to be recorded on the screen; and blanking the screen after a predetermined amount of time.

6. The method of claim 5 further comprising the step of:

providing an audio signal after the predetermined amount of time.

7. The method of claim 5 wherein the redisplaying step comprises the step of:

displaying the mirror image of the image to be recorded on the screen.

8. The method of claim 4 further comprising the step of:

positioning a lens between the image sheet and the screen.

9. The method of claim 4 wherein the activating step comprises the step of:

activating image-display software on a portable computer having a liquid-crystal-display (LCD) screen.

10. A method for recording an image displayed on a screen comprising the steps of:

providing an assembly including:

an opaque sleeve having a slot formed in one side thereof and an aperture formed in one face thereof;

a plurality of image sheets receivable within the opaque sleeve; and a shield receivable within the opaque sleeve and slidable through the slot of the opaque sleeve;

positioning the assembly in front of a screen on which an image is displayable with the aperture of the opaque sleeve facing the screen;

opening the aperture by sliding the shield out of the opaque sleeve through the slot; and exposing one of the image sheets to an image displayed on the screen for a predetermined amount of time.

11. The method of claim 10 further comprising the step of:

developing the exposed image sheet.

12. The method of claim 11 further comprising the step of:

repeating the exposing step and the developing step a plurality of times.

13. A method for recording an image displayed on a screen comprising the steps of:

providing an assembly including:

an opaque sleeve having a slot formed in one side thereof and an aperture formed in one face thereof;

an image sheet receivable within the opaque sleeve and including a layer of microcapsules containing photo-hardenable chemicals which solidify upon exposure to a predetermined range of wavelengths of radiation; and a shield receivable within the opaque sleeve and slidable through the slot of the opaque sleeve;

positioning the assembly in front of a screen on which an image is displayable with the aperture of the opaque sleeve facing the screen;

opening the aperture sliding the shield out of the opaque sleeve through the slot; and exposing the image sheet to an image displayed on the screen for a predetermined amount of time.

14. The method of claim 13 further comprising the step of:

developing the image sheet.

15. The method of claim 14 wherein the developing step comprises the steps of:

closing the aperture by sliding the shield back into the opaque sleeve through the slot; and rupturing nonsolidified microcapsules of the image sheet.

16. The method of claim 15 wherein the rupturing step comprises the step of:

rupturing nonsolidified microcapsules of the image sheet by sliding the assembly across a substantially sharp edge.

17. The method of claim 14 wherein the developing step comprises the step of:

removing the image sheet from the opaque sleeve through the slot while simultaneously rupturing nonsolidified microcapsules of the image sheet.

18. The method of claim 14 wherein the developing step comprises the step of:

removing the image sheet from the opaque sleeve through the slot while simultaneously rupturing nonsolidified microcapsules of the image sheet by drawing the image sheet between a pair of rollers.

19. The method of claim 14 wherein the developing step comprises the step of:

removing the image sheet from the opaque sleeve through the slot while simultaneously rupturing nonsolidified microcapsules of the image sheet by drawing the image sheet across at least one substantially sharp edge.

20. The method of claim 10 wherein the positioning step comprises the step of:

positioning the assembly in front of a liquid-crystal-display screen with the aperture of the opaque sleeve facing the screen.

21. The method of claim 10 further comprising prior to the positioning step the step of:

displaying the image to be recorded on the screen.

22. The method of claim 21 wherein the exposing step comprises the step of:

closing the aperture by sliding the shield into the opaque sleeve after a predetermined amount of time.

23. The method of claim 10 wherein the exposing step comprises the step of:

displaying the image to be recorded on the screen for a predetermined amount of time.

* * * * *